United States Patent
Woirhaye et al.

(10) Patent No.: US 8,473,461 B1
(45) Date of Patent: Jun. 25, 2013

(54) FILE INFECTION REMOVAL BY DIFFERENTIAL COPY

(75) Inventors: Brendon Vincent Woirhaye, Whittier, CA (US); William E. Sobel, Jamul, CA (US)

(73) Assignee: Symantec Corporation, Mountain View, CA (US)

( * ) Notice: Subject to any disclaimer, the term of this patent is extended or adjusted under 35 U.S.C. 154(b) by 315 days.

(21) Appl. No.: 12/127,595

(22) Filed: May 27, 2008

(51) Int. Cl.
*G06F 12/14* (2006.01)
*G06F 17/60* (2006.01)

(52) U.S. Cl.
USPC .............................. 707/640; 726/22; 705/59

(58) Field of Classification Search
USPC 707/674, 675, 678, 681, 640; 726/22; 705/59
See application file for complete search history.

(56) References Cited

U.S. PATENT DOCUMENTS

| | | | |
|---|---|---|---|
| 5,999,179 A * | 12/1999 | Kekic et al. | 715/734 |
| 6,088,694 A * | 7/2000 | Burns et al. | 1/1 |
| 6,611,850 B1 * | 8/2003 | Shen | 1/1 |
| 7,114,184 B2 * | 9/2006 | Malivanchuk et al. | 726/24 |
| 7,367,056 B1 * | 4/2008 | Szor et al. | 726/24 |
| 7,756,834 B2 * | 7/2010 | Masters et al. | 707/640 |
| 2006/0085686 A1 * | 4/2006 | Cheston et al. | 714/38 |
| 2008/0016564 A1 * | 1/2008 | Claudatos et al. | 726/22 |

* cited by examiner

*Primary Examiner* — Truong Vo
*Assistant Examiner* — Sabana Rahman
(74) *Attorney, Agent, or Firm* — Brill Law Office; Jeffrey Brill

(57) ABSTRACT

Recoverable file information and file content are maintained for a plurality of files. Responsive to detecting a damaged file on a computer system, the recoverable file information is used to identify a specific instantiation of the file to be restored. The computer is searched for a non-damaged, local copy of the file. If a non-damaged, local copy is found, it is used to replace the damaged file. Otherwise, a difference file is created which identifies the sections of the damaged file that differ from a non-damaged specific instantiation thereof. Using the difference file and appropriate maintained file content, the relevant sections of the damaged file are rebuilt, thereby restoring it to its original condition.

16 Claims, 3 Drawing Sheets

FILE INFECTION REMOVAL BY DIFFERENTIAL COPY

TECHNICAL FIELD

This invention pertains generally to computer security, and more specifically to using the differences between an infected file and the original to restore the infected file to usable condition.

BACKGROUND

An increasing amount of malware (e.g., viruses, worms, Trojan horses and the like) is returning to the model of hiding in a host file, rather than existing in an file of its own and spreading itself across computer systems. This type of malware injects itself into an existing executable image (or other type of file), modifying it in such a way that the original application (generally) works as expected, but at the same time quietly hosts the malware. Unlike simple file based malware, removing such infections requires undoing the modifications made to the original executable, rather than simply destroying the malicious files. The modifications made to the host file may be polymorphic, and thus unique to each infection.

Moving towards a white listing model makes the detection of such modified binaries easier than with the currently widespread black list technology. Under such a model, rather than searching for the signature of known (blacklisted) malicious code, binaries are checked against a list of signatures for known benevolent programs (a whitelist). Thus, for various known files, signatures are maintained for the various known versions, revisions, release sets, etc. If a binary being checked by security software does not match one of the known good signatures for a binary of its name, description, version information, etc., it is assumed to be malicious.

Although the above described whitelisting methodologies can be used to detected infection of a host file, it would be desirable to be able to be able to remove such detected infections.

SUMMARY

Damaged files on a local computer are restored to their original condition, so that they can be used without causing problems. A damaged file can be one that has been infected with malicious code, as well as a corrupted or accidently deleted file. Recoverable file information and file content are maintained for a plurality of files. Responsive to detecting damaged file on a computer system, the recoverable file information is used to identify a specific instantiation of the file to be restored. The computer is searched for a non-damaged, local copy of the file. If a non-damaged, local copy is found, it is used to replace the damaged file. Otherwise, a difference file is created which identifies the sections of the damaged file that differ from a non-damaged specific instantiation thereof. Using the difference file and appropriate maintained file content, the relevant sections of the damaged file are rebuilt, thereby restoring it to its original condition.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
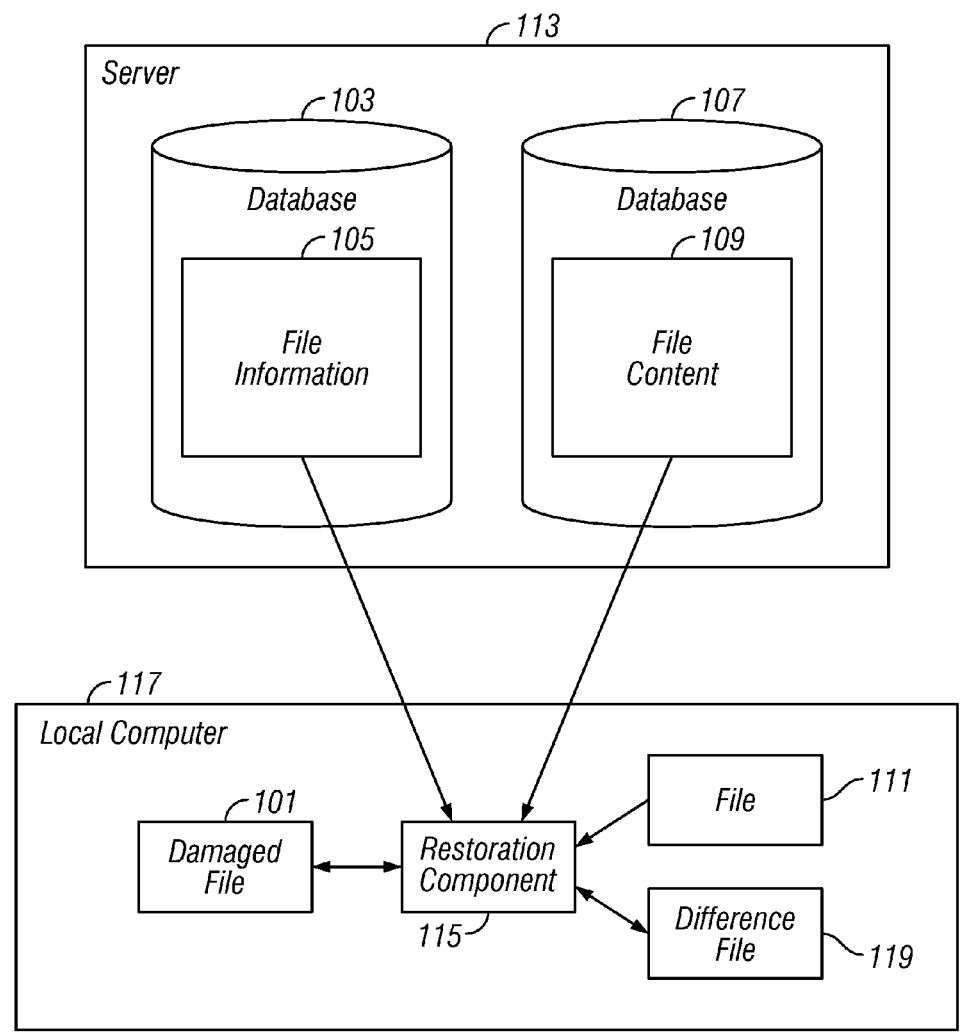
FIG. 1 is a block diagram illustrating a system for restoring infected files to their original condition, according to some embodiment of the present invention.

FIG. 1 illustrates a system for restoring infected files 101 to their original condition, according to some embodiments of the present invention. It is to be understood that although various components are illustrated in FIG. 1 as separate entities, each illustrated component represents a collection of functionalities which can be implemented as software, hardware, firmware or any combination of these. Where a component is implemented as software, it can be implemented as a standalone program, but can also be implemented in other ways, for example as part of a larger program, as a plurality of separate programs, as a kernel loadable module, as one or more device drivers or as one or more statically or dynamically linked libraries.

As illustrated in FIG. 1, a database 103 of recoverable file information 105 and a logically (although not necessarily physically) separate database 107 of file content 109 are maintained. The recoverable file information 105 comprises data that can be used to identify the correct file 111 to restore when an infected file 101 is detected. Non-exhaustive examples of such file information 105 include the names, sizes, section hashes, version numbers, release numbers, revisions numbers, peer sets, other files in release sets, etc., of known good files 111. In other words, this database 103 can store any information 105 concerning a specific instantiation of a known good application file 111 that can help identify that file 111 in the context of file restoration. The file contents 109 database 107 stores actual bits 109 comprising the various sections of known good files 111, for use in rebuilding infected versions 101 of such files 111 as described in detail below.

FIG. 1 illustrates both databases 103, 107 as residing on a centrally located security server 113 (hosted by, e.g., a vendor of computer security solutions). It is to be understood that either or both database 103, 107 can instead be hosted by a trusted third party such as an ISP, hosted within a corporation or even distributed, e.g., in a peer to peer network. Where specifically to store the databases 103, 107 is a variable design parameter. Additionally, the specific implementation mechanics to use for storing data is a variable design choice. For example, any suitable type of database (or similar storage mechanism) can be utilized, as desired. In some embodiments, a single database is used for both storage functions, whereas in other embodiments, multiple databases can be used for each and/or both storage functions, for example a local corporate database and a more global database accessible to a vendor of the security solution.

Responsive to detecting an infected file 101, a restoration component 115 restores the infected file 101 to its original state. First, the restoration component 115 checks the local computer 117 on which the infected file 101 was detected for an existing, uncorrupted copy 111 of the correct version of the file. Because many versions, revisions, releases, updates, etc., of files are often in existence, the restoration component 115 can refer to the recoverable file information 105 stored in the database 103 to properly identify any locally existing, uninfected copy 111 of the specific version of the file. In many cases, a clean copy 111 of the file can be obtained from an installation cache (for example Microsoft Office Files, Windows Service Pack files), from system restore points and/or from a local backup copy. If the correct version 111 is found, it is used to simply replace the infected file 101. It is to be understood that although the above examples suggest Windows, the present invention is not limited to Windows environments, and some embodiments are tailored for non-Windows platforms.

Note that the restoration component 115 is illustrated as running on a local, user computer 117. It is to be understood that the restoration functionality can also execute from the centrally located security server 113 or from elsewhere. This functionality can also be distributed between multiple computing devices as desired.

If a local, clean copy 111 of the correct version of the file cannot be found, the restoration component 115 creates a difference file 119, indicating which sections of the infected file 101 differ from the original 111. Because infecting malware only modifies a small portion of a host file, most of the infected copy 101 of the file will not differ at a bit level from the original version 111 thereof. The difference file 119 can be built by hashing portions of the infected file 101, and comparing those to stored portion hashes 109 of the non-corrupted file 111. By identifying modified sections, the difference file 119 indicates what portions of the infected file 101 need to be restored, and hence what content 109 is needed to return the file to its original state.

Note that the difference file 119 does not need to include the actual data itself, but instead can simply identify those portions of the file that are to be repaired. The restoration component 115 refers to the difference file 119, and retrieves the actual content 109 pertaining to the corrupted sections of the infected file 101 from the recovery file content database 107. Using the retrieved content 109, the restoration component 115 modifies the infected file 101 to return it to its original, unmodified state 111. The restoration component 115 can refer to the stored recoverable file information 105 to properly identify the correct specific version of the file. It is to be understood that the present invention is not limited to repairing files infected by malware, and but also be utilized repair accidently or mechanically corrupted files and/or deleted files and the like.

Figure 2:
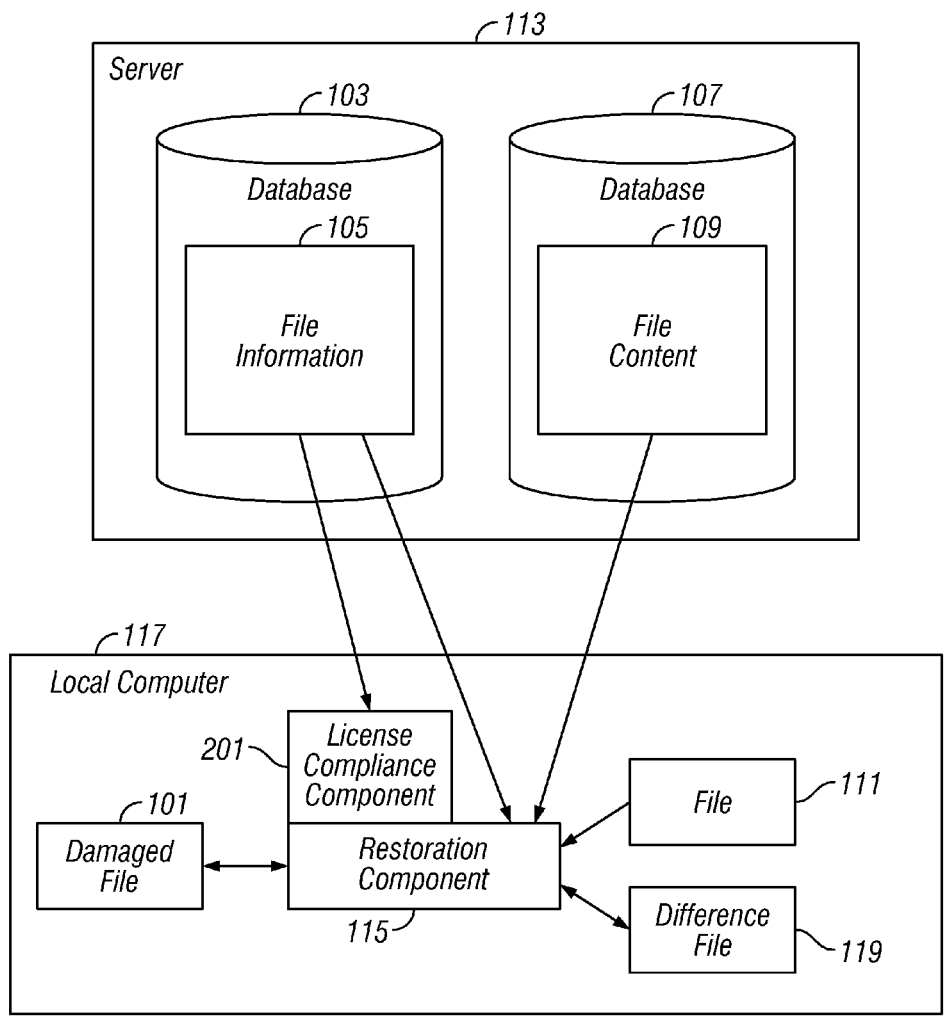
FIG. 2 is a block diagram illustrating a system for determining whether a user is licensed for an application to be restored, according to some embodiment of the present invention.

As illustrated in FIG. 2, in some embodiments a license compliance component 201 inventories the local computer 117 and determines whether the user is licensed for the application to be repaired. In other words, before the restoration component 115 repairs a corrupted file 101, the license compliance component 201 ensures that the user is actually licensed to use that application. This prevents the file repair provider from being tricked into being used as a software piracy mechanism. Without such a check, a dishonest user might be able to simulate having a corrupted file 101, and thereby cause the restoration component 115 to create a working version of the application which the user did not actually have in the first place. Additionally, a user could have an actual unlicensed copy of an file 101 which has become infected. Because the user is not licensed for the application, it is not desirable to restore the original file 111 for the user.

To implement this check, the license compliance component 201 can refer to the stored recoverable file information 105 to identify indications of the what should be present on the local computer 117 if the user is indeed licensed for the relevant application. For example, often other files in a peer set such as configuration files and the like should be present. The license compliance component 201 compares the expected conditions to the actual state of the local computer 117 to determine whether the user is licensed.

For example, suppose that a local copy of the executable for Microsoft Word® (Winword.exe) is infected, and the stored information 105 concerning the specific version of Microsoft Word® in question indicates that it is only shipped as part of Microsoft Office®. If no other Microsoft Office® files are found on the local computer 117, the license compliance component 201 could conclude that the user is not licensed. This is simply an example of how file information 105 can be compared to the state of a local computer 117 to determine if a user is licensed for a given application. If the license compliance component 201 determines that the user is not licensed, the restoration component 115 can simply not repair the infected file 111, and optionally warn the user that it is infected.

Figure 3:
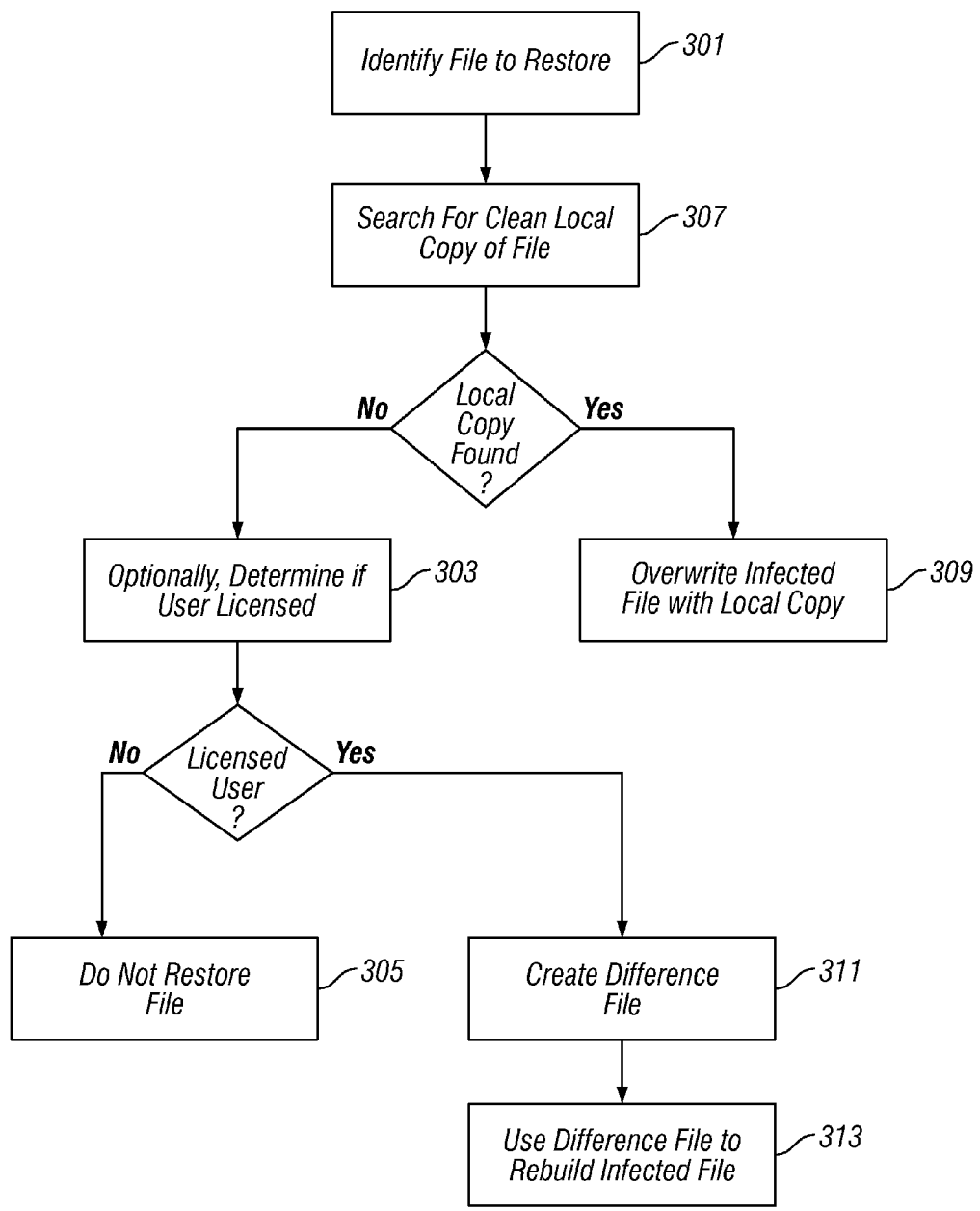
FIG. 3 is a flowchart illustrating steps for restoring infected files to their original condition, according to some embodiment of the present invention.

FIG. 3 illustrates steps for restoring infected files 101 to their original condition, according to some embodiments of the present invention. Responsive to detecting an infected file 101, the restoration component 115 identifies 301 the specific instantiation of the file to be restored. The restoration component 115 searches 307 for an uncorrupted local copy 111 of the file. If a clean local copy 111 is located, it is used to replace 309 the corrupted file 101. If no local copy 111 is available, optionally, the license compliance component 201 determines 303 whether the user is licensed for the application. If not, the infected file 101 is not restored 305. If the user is licensed (or if this check is not made), the restoration component 115 creates 311 a difference file 119, which identifies the sections of the corrupted file 101 that differ from the original, and therefore need to be repaired. The restoration component 115 uses the difference file 119 and the stored file content 109 to rebuild 313 the corrupted sections of the infected file 101, thereby restoring it to its original condition.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies and other aspects are not mandatory or significant, and the mechanisms that implement the invention or its features may have different names, divisions and/or formats. Furthermore, as will be apparent to one of ordinary skill in the relevant art, the portions, modules, agents, managers, components, functions, procedures, actions, layers, features, attributes, methodologies and other aspects of the invention can be implemented as software, hardware, firmware or any combination of the three. Wherever a component of the present invention is implemented as software, the component can be implemented as a script, as a standalone program, as part of larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Furthermore, it will be readily apparent to those of ordinary skill in the relevant art that where the present invention is implemented in whole or in part in software, the software components thereof can be stored on computer readable media as computer program products. Any form of computer readable medium can be used in this context, such as magnetic or optical storage media as well as solid state/flash media. Additionally, software portions of the present invention can be instantiated (for example as object code or executable images) within the memory of any computing device. Accordingly, the disclosure of the present invention is intended to be illustrative, but not limiting, of the scope of the invention, which is set forth in the following claims.

What is claimed is:

1. A computer implemented method for restoring damaged files to their original condition, the method comprising the steps of:
   maintaining recoverable file information and file content concerning a plurality of files;
   responsive to detecting a damaged file on a computer system, utilizing recoverable file information to identify a version of the file to be restored;
   searching for a non-damaged, local copy of the version of the file to be restored on the computer system;
   examining the computer system and determining whether the damaged file to be restored is licensed for use thereon by confirming the presence of a peer set of configuration files, the peer set of configuration files comprising other applications licensed with a particular version of the file; and
   responsive to the damaged file being licensed, performing at least one additional step to restore the damaged file to its original condition, the specific at least one additional step being selected responsive to the results of the searching step, wherein
   responsive to not finding a non-damaged, local copy of the version of the file to be restored on the computer system, creating a difference file which identifies each of the sections of the damaged file that differ from a non-damaged version thereof, and
   using the difference file and appropriate maintained file content to rebuild only damaged sections of the damaged file, thereby restoring it to its original condition.

2. The method of claim 1 further comprising:
   finding a non-damaged, local copy of the version of the file to be restored on the computer system; and
   replacing the damaged file with the non-damaged, local copy.

3. The method of claim 1 wherein creating the difference file further comprises:
   hashing portions of the damaged file;
   retrieving maintained hashes of portions of the version of the original file; and
   comparing the hashed portions of the damaged file to the hashes of the portions of the original file to identify sections that differ.

4. The method of claim 1 wherein examining the computer system and determining whether the file to be restored is licensed for use thereon further comprises:
   referring to maintained recoverable file information to identify conditions present on a computer system in a case in which the specific file to be restored is licensed for use thereon; and
   comparing identified conditions to an actual state of the computer system.

5. The method of claim 1 further comprising:
   responsive to determining that the file to be restored is not licensed for use on the computer system, not restoring that file.

6. The method of claim 1 wherein at least one damaged file further comprises a file type from a group of file types consisting of:
   an infected file;
   a corrupted file; and
   a deleted file.

7. The method of claim 1, wherein searching for a non-damaged, local copy of the version of the file to be restored on the computer system comprises:
   searching an installation cache or a system restore point.

8. At least one non-transitory computer readable medium storing a computer program product for restoring damaged files to their original condition, the computer program product comprising:
   program code for maintaining recoverable file information and file content concerning a plurality of files;
   program code for responsive to detecting a damaged file on a computer system, utilizing recoverable file information to identify a version of the file to be restored;
   program code for searching for a non-damaged, local copy of the version of the file to be restored on the computer system;
   examining the computer system and determining whether the damaged file to be restored is licensed for use thereon by confirming the presence of a peer set of configuration files, the peer set of configuration files comprising other applications licensed with a particular version of the file; and
   program code for responsive to the damaged file being licensed, performing at least one additional step to restore the damaged file to its original condition, the specific at least one additional step being selected responsive to the results of the searching step, wherein
   program code for, responsive to not finding a non-damaged, local copy of the version of the file to be restored on the computer system, creating a difference file which identifies each of the sections of the damaged file that differ from a non-damaged version thereof, and
   program code for using the difference file and appropriate maintained file content to rebuild only damaged sections of the damaged file, thereby restoring it to its original condition.

9. The computer program product of claim 8 further comprising:
   program code for finding a non-damaged, local copy of the version of the file to be restored on the computer system; and
   program code for replacing the damaged file with the non-damaged, local copy.

10. The computer program product of claim 8 wherein the program code for creating the difference file further comprises:
   program code for hashing portions of the damaged file;
   program code for retrieving maintained hashes of portions of the version of the original file; and
   program code for comparing the hashed portions of the damaged file to the hashes of the portions of the original file to identify sections that differ.

11. The computer program product of claim 8 wherein the program code for examining the computer system and determining whether the file to be restored is licensed for use thereon further comprises:
  program code for referring to maintained recoverable file information to identify conditions present on a computer system in a case in which the specific file to be restored is licensed for use thereon; and
  program code for comparing identified conditions to an actual state of the computer system.

12. The computer program product of claim 8 further comprising: program code for, responsive to determining that the file to be restored is not licensed for use on the computer system, not restoring that file.

13. The computer program product of claim 8 wherein at least one damaged file further comprises a file type from a group of file types consisting of:
  an infected file;
  a corrupted file; and
  a deleted file.

14. A computer system for restoring damaged files to their original condition, the computer system comprising:
  a memory device comprising a database to maintain recoverable file information and file content concerning a plurality of files; and
  a restoration component to, responsive to detecting a damaged file on a computer system, utilize recoverable file information to identify a version of the file to be restored, the restoration component to search for a non-damaged, local copy of the version of the file to be restored on the computer system, the restoration component to examine the computer system and determine whether the damaged file to be restored is licensed for use thereon by confirming the presence of a peer set of configuration files, the peer set of configuration files comprising other applications licensed with a particular version of the file, the restoration component to, responsive to the damaged file being licensed, perform at least one additional step to restore the damaged file to its original condition, the specific at least one additional step being selected responsive to the results of the searching step, wherein
  responsive to not finding a non-damaged, local copy of the version of the file to be restored on the computer system, the restoration component creates a difference file which identifies the sections of the damaged file that differ from a non-damaged version thereof, and the restoration component uses the difference file and appropriate maintained file content to rebuild only damaged sections of the damaged file, thereby restoring it to its original condition.

15. The computer system of claim 14 wherein the restoration component finds a non-damaged, local copy of the version of the file to be restored on the computer system, and replaces the damaged file with the non-damaged, local copy.

16. The computer system of claim 14 wherein the restoration component hashes portions of the damaged file, retrieves maintained hashes of portions of the version of the original file, and compares the hashed portions of the damaged file to the hashes of the portions of the original file to identify sections that differ.

* * * * *